United States Patent Office 3,557,059
Patented Jan. 19, 1971

3,557,059
DIGUANAMINE RESIN
Yoko Hattori, Tokyo, Tamiki Ooji, Kawasaki-shi, and Kiichiro Tanaka and Takao Matsunaga, Yokohama-shi, Japan, assignors to Toka Shikiso Chemical Industry Co., Ltd., and Ajinomoto Co., Inc., both of Tokyo, Japan
No Drawing. Filed Sept. 10, 1968, Ser. No. 758,681
Int. Cl. C08g 9/28
U.S. Cl. 260—67.6                    2 Claims

ABSTRACT OF THE DISCLOSURE

Compounds of the formula

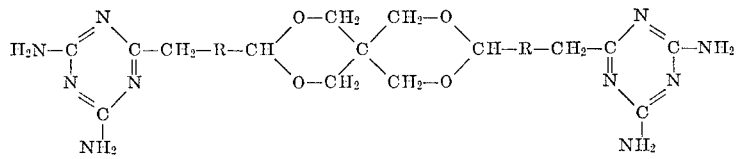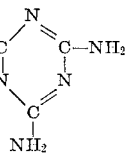

readily form methylol derivatives with formaldehyde, and the methylol derivatives may be further modified by ether formation with lower monohydric or polyhydric alkanols to produce resins soluble in aromatic hydrocarbons and capable of forming organic coatings on metal either by themselves or in combination with known film forming resins. The coatings have outstanding resistance to ultraviolet radiation.

---

This invention relates to synthetic resins, and particularly to resins of the amine-formaldehyde type.

We have found that resins of the invention prepared by condensing a spiroacetal guanamine of Formula (I) with an excess of formaldehyde, and by further forming an ether of the resulting methylol derivative with a lower monohydric or polyhydric alkanol form films which have outstanding resistance to ultraviolet radiation, as compared to films prepared from conventional resins of similar type, such as urea-formaldehyde condensates, melamine-formaldehyde condensates, or benzoguanamine-formaldehyde condensate. The films of the invention are also tough and flexible.

The resins of the invention may be compounded in a conventional manner, together with other resins. They are highly compatible, for example, not only with vegetable oil-modified alkyd resins but also with thermosetting acrylic resins in a manner available heretofore only with benzoguanamine resins. The resins of the invention share this desirable property of the benzoguanamine resins as well as the solvent-resistance and non-staining characteristics of the known resins, but the resins of the invention do not discolor nor lose mechanical strength when exposed to sunlight, a serious shortcoming of the benzoguanamine resins, which makes the known resins unsuited for outdoor coating applications.

The good resistance to ultraviolet radiation is also characteristic of films prepared from blends or partial condensates of the resins of the invention with other film-forming resins, such as the aforementioned alkyd and acrylic resins. The blends or condensates adhere well to metal, glass, wood, paper, cloth, and other substrates, and have superior flexibility and impact resistance.

The spiroacetal guanamines which are intermediates for the preparation of the resins are formed readily when 3,9-bis-cyanoalkyl-2,4,8,10-tetroxaspiro[5.5]undecane and dicyanodiamide are refluxed in a mole ratio of approximately 1:2 in a common solvent, such as ethyleneglycol monoalkyl ethers or dioxane in the presence of a basic catalyst, such as sodium or potassium hydroxide, the cyanoalkyl being either 2-cyanoethyl or 1,1-dimethyl-3-cyanopropyl.

The spiroacetal guanamines are converted to the resins of the invention by a sequence of reactions similar to those employed for converting urea or melamine to resinous condensation products. The spiroacetal guanamine is first reacted with formaldehyde to the corresponding methylol derivative, and the latter is etherified with a lower monohydric or polyhydric alkanol. The rings of the original molecule remain unchanged during these reactions.

The formaldehyde may be supplied to the reaction mixture in any suitable form, for example, as a solution of formaldehyde in water or alcohols, as paraformaldehyde or any other compound which yields formaldehyde under the conditions prevailing in the reaction zone.

Alkanols which have been used successfully in an etherification reaction with the methylol derivatives of the invention include methanol, ethanol, n-propanol, i-propanol, n-butanol, i-butanol, ethyleneglycol, propyleneglycol, and mixtures of these alcohols. Monoester of glycols may also be used.

The formaldehyde is used in excess, and four to eight moles of formaldehyde are necessary per mole of spiroacetal guanamine if the resin produced is to have good compatibilty with other film-forming resins and the other desirable properties enumerated above. Resins prepared with less than four moles of formaldehyde per mole of spiroacetal guanamine do not blend readily with acrylic resins and alkyds, and the films prepared from such resins have inferior gloss and weather resistance; also lower mechanical strength and reduced resistance to staining.

The alcohol is employed in the etherification reaction in a mole ratio of 1:1 to 3:1 relative to the initially employed formaldehyde.

The methylol derivative may be formed at any temperature from about 50° C. upward, the upper temperature limit being set by the boiling point, not usually higher than 120° C., of the reaction mixture which consists of the guanamine, the formaldehyde, and inert solvents, preferably lower alkanols and/or water, and having a pH of 5.0 to 9.0. The nature of the agent employed for arriving at the desired pH is immaterial, but sodium or potassium hydroxide, ammonia or sodium carbonate are usually most conveniently at hand. The spiroacetal guanamines react more slowly with formaldehyde than melamine or benzoguanamine. The reaction requires ½ to 2 hours at refluxing temperature.

The reaction mixture containing the methylol spiroacetal guanamine may be directly adjusted to a pH between 4.0 and 6.0 by means of any convenient organic or inorganic acid, and then refluxed for etherification if it contains the alcohol needed for ether formation. The mixture is held substantially at its boiling point until the ether is formed. The water simultaneously released by the ether formation is preferably removed to hasten the reaction which is relatively slow at best, and make take 3 to 10 hours under typical conditions.

The resulting resin solution is not usually in a form suitable for compounding to an organic coating material. It normally contains an excess of alcohol which is readily distilled off and replaced by another solvent, if so desired.

Resins having most of the desirable properties of the guanamine resins of this invention are obtained if the spiroacetal guanamine is replaced in part by other reactive amines in the reaction with formaldehyde. Improved melamine and benzoguanamide resins are obtained if even a minor amount of spiroacetal guanamine is admixed to melamine or benzoguanamine prior to the reaction of the latter with formaldehyde.

Coatings of particularly high quality are obtained if the diguanamine resins of the invention are combined in amounts of 5 to 60 percent of total resin weight with thermosetting acrylic resins. The resin mixture is highly resistant to the influence of weather when used clear, and further improves in a known manner when mixed with suitable pigments and other additives.

The thermosetting acrylic resins which are preferably employed in conjunction with the diguanamine resins of this invention are prepared by copolymerizing an alkyl ester of acrylic, methacrylic, crotonic, or another $\alpha$, $\beta$-unsaturated carboxylic acid with a reactive monomer such as acrylic acid, methacrylic acid, monoesters of maleic or fumaric acid, hydroxyalkyl esters of these olefinic acids, such as $\beta$-hydroxyethyl acrylate, $\beta$-hydroxyethyl methacrylate, allyl alcohol, allyl ethers of polyhydric alcohols, glycidyl ally ethers, glycidyl acrylate, glycidyl methacrylate, acrylamide and its N-methylol or alkylated N-methylol derivatives. Suitable alkyl esters of the afore-mentioned $\alpha$, $\beta$-unsaturated carboxylic acids include the methyl, ethyl, isopropyl, butyl, and octyl esters.

The copolymerization is carried out in toluene, xylene, butanol, methylisobutylketone, or like inert solvent in the presence of catalysts. Examples of catalysts include azo compound such as $\alpha,\alpha'$-azobis-isobutyronitrile, or organis peroxide such as benzoyl peroxide or di-t-butyl peroxide.

The acrylic resins employed should be free from polymerization products of aromatic unsaturated monomers, such as styrene or vinyl toluene, if high resistance to ultraviolet radiation is desired.

A very good acrylic resin for use in organic coatings jointly wtih the diguanamine resins of the invention is prepared from 60% to 80% alkyl acrylate or methacrylate, 15% to 30% $\beta$-hydroxyethyl acrylate or the corresponding hydroxypropyl ester, 1–10% free acrylic or methacrylic acid, and 0–20% acrylamide or its N-methylol derivative. Many other suitable thermosetting acrylic resins will readily be selected by those skilled in this art.

The following examples are further illustrative of this invention, and it will be understood that the invention is not limited thereto:

In these examples 3,9-bis[2-(2,4-diamino-1,3,5-triaza-6-phenyl)ethyl]-2,4,8,10-tetroxaspiro[5.5]undecane will be referred to as "Compound A," and 3,9-bis[3-(2,4-diamino - 1,3,5 - triaza - 6 - phenyl) - 1 - dimethylpropyl]-2,4,8,10-tetroxaspiro[5.5]-undecane as "Compound B."

EXAMPLE 1

Compound A was prepared as follows:
160 g. (1.9 moles) dicyanodiamide, 240 g. (0.9 mole) 3,9 - bis(2 - cyanoethyl - 2,4,8,10 - tetroxaspiro[5.5]undecane, 400 ml. ethyleneglycol monomethyl ether, and 8 g. sodium hydroxide were placed in a 1-liter three-neck flask equipped with a stirrer, a reflux condenser, and a thermometer, and the mixture was heated and stirred. A transparent solution was formed as the temperature rose. An exothermic reaction started near 120 degrees C., and the reaction mixture boiled while it became turbid and white crystals were precipitated.

After stirring for 2½ hours at approximately 120 degrees C., the reaction mixture was poured into 3 liters hot water. The white, crystalline precipitate was recovered by filtration, washed with hot water, and dried. It weighed 372 g. (95.1% yield) and melted at 270 degrees–272 degrees C. It was identified as Compound A by the absence of the absorption band at 2265 cm.$^{-1}$ which is characteristic of the CN group in the infrared spectrum of the starting material, and by the presence of absorption bands at 1635 and 1550 cm.$^{-1}$ characteristic ot the triazine ring. It was further identified by elementary analysis:

Calculated for $C_{17}H_{26}N_{10}O_4$ (percent): C, 46.48; H, 6.12; N, 31.89. Found (percent): C, 47.01; H, 6.03; N, 32.24.

EXAMPLE 2

160 g. (1.9 moles) dicyanodiamide, 315 g. (0.9 mole) 3,9 - bisdimethyl - 3 - cyanopropyl) - 2,8,10 - tetroxaspiro [5.5]undecane, 400 ml. ethyleneglycol monomethyl ether and 8 g. sodium hydroxide were placed in a 1-liter three-neck flask equipped as described in Example 1. The mixture was held at 120 degrees–130 degrees C. for 2½ hours with stirring, and was then poured into 3 liters hot water. The crystalline precipitate formed was filtered off, washed, and dried. It weighed 434 g. (93.2% yield) and had a melting point at 288 degrees–290 degrees C.

It was identified as Compound B by its infrared spectrum as in Example 1, and by its elementary analysis:

Calculated for $C_{23}H_{38}N_{10}O_4$ (percent): C, 53.15; H, 7.45; N, 26.95. Found (percent): C, 53.27; H, 7.36; N, 27.01.

EXAMPLE 3

A round-bottom, three-neck flask equipped with a stirrer, a thermometer, and a condenser suitable for refluxing and having a water trap was charged with 434 g. (1.0 mole) Compound A, 450 g. of a solution of 40% (weight) formaldehyde (6.0 moles) in 50% n-butanol and 10% water, and 670 g. isobutanol. Enough (2.5 ml.) aqueous sodium hydroxide solution was added to raise the pH of the mixture to 7.2, and it was then refluxed for 60 minutes.

After cooling to 80 degrees C., it was adjusted to pH 4.2–4.4 by the addition of 5.0 ml. 25% aqueous phosphoric acid, and heated for 10 hours at 95–115 degrees C., the water formed by the condensation reaction being distilled off. The removed water amounted to 130 g. When the distillate was practically free of water, 350 g. of the butanols still present were removed by vacuum distillation at temperatures below 120 degrees C.

The residue was diluted with 350 g. xylene, and the resulting transparent resin solution weighed 1380 g. and contained 50% non-volatile resin. It had the following additional properties:

Neutralization value—0.6
Vixcosity (by Gardner-Holdt bubble, viscometer at 25 degrees C.)—B–C
Colour (Gardner)—1>
Mineral spirit tolerance—1.4 ml./g.

EXAMPLE 4

The procedure of Example 3 was repeated with 409 g. (1.0 mole) Compound A, 391 g. formaldehyde solution (5.0 moles formaldehyde), and 767 g. i-butanol. The amount of water removed was 110 g., and the amount of butanols recovered from the combined initial total of 13 moles was 450 g. The residue obtained after removal of the butanols by distillation was diluted with 340 g. xylene to produce a transparent resin stock solution containing 50.6% solids and having the following properties:

Neutralization value—0.6
Viscosity—E–F
Color (Gardner)—1≫
Mineral spirit tolerance—1.4 ml./g.

EXAMPLE 5

The flask described in Example 3 was charged with 205 g. (0.5 mole) Compound A, 488 g. of the formaldehyde solution of Example 3 (6.5 mole formaldehyde), 360 g. isobutanol, and 5.5 ml. aqueous 10% sodium carbonate solution, and the mixture was heated to 60 degrees C. at which temperature its pH was 5.0–5.6 as determined by B.C.G. test paper. After refluxing for 60 minutes, the mixture was cooled, and 126 g. (1 mole) melamine and 360 g. isobutanol were added. The composition so obtained was held at 55–60 degrees C. for 30 minutes, adjusted to pH 4.2 (B.C.G. test paper) with 2.7 ml. formic acid, and refluxed for ten hours, while 160 g. water were removed.

When the reaction mixture was practically free from water, it was heated to 120 degrees C. to remove 430 g. butanol by distillation, and the residue was diluted with 300 g. xylene to produce a solution containing 52.9% (by weight) melamine-spiroacetal diguanamine resin as a co-condensate. The resin solution had the following properties:

Neutralization value—0.8
Viscosity—E
Color (Gardner)—1>
Mineral spirit tolerance—2.5 ml./g.

EXAMPLE 6

The procedure of Example 3 was repeated with an initial mixture of 47.0 g. benzoguanamine, 102.0 g. Compound A, 169.0 g. formaldehyde solution, 249.0 g. isobutanol, and 1.0 ml. 10% NaOH solution. 2.0 ml. phosphoric acid solution were needed for acidification, and 35 g. water and 170 g. butanol were removed.

The residue from the butanol distillation was diluted with 80 g. xylene to produce a solution containing 55.3% solid resin and having the following properties:

Neutralization value—0.75
Viscosity—D'
Color (Gardner)—1>
Mineral spirit tolerance—1.5 ml./g.

EXAMPLE 7

The flask described in Example 3 was charged with 518 g. Compound B, 450 g. formaldehyde solution (as in Example 3), and 900 g. isobutanol. The mixture was adjusted to pH 7.2 with 2.5 ml. 10% sodium hydroxide solution and refluxed thereafter for 60 minutes. It was then cooled to 80 degrees C., adjusted to pH 4.0–4.5 with 5.5 ml. aqueous 25% phosphoric acid, and heated for ten hours at 95 degrees to 115 degrees C., whereby 130 g. water were removed. When the distillate was free from water, the mixture was partly evaporated at less than 120 degrees C. in a vacuum to recover 200 g. of a butanol mixture. The cooled residue was mixed with 500 g. xylene to produce 2340 g. of a transparent resin solution containing 50% solids by weight. The resin solution had the following properties:

Neutralization value—0.8
Viscosity—D
Color (Gardner)—<1
Mineral spirit tolerance—1.8 ml./g.

EXAMPLE 8

350 g. titanium dioxide pigment (rutile type) was mixed for 48 hours in a ball mill with 700 g. of a 50% acrylic

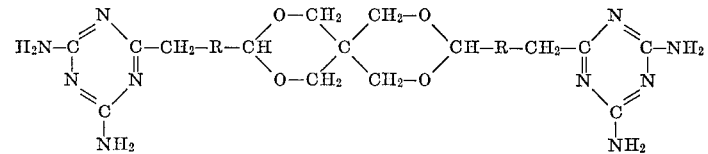

resin solution obtained by copolymerizing 50% ethyl acrylate, 30% methyl methacrylate, 15% β-hydroxyethyl methacrylate, and 5% methacrylic acid in a xylene-butanol medium in the presence of benzoyl peroxide as a catalyst. A white paste containing acrylic resin and pigment in a ratio of 1:1 was obtained.

120 g. white acrylic paste and 34 g. of the 50% resin solution prepared by the method of Example 3 were mixed to produce a white enamel containing acrylic resin and diguanamine resin in a ratio of 7:3, and pigment and the combined resins in a ratio of 4:6.

A similar white enamel was prepared by mixing the white acrylic paste with the resin solutions of Examples 5, 6, and 7, and the four batches enamel A, B, C, D obtained were compared with conventional controls E, F prepared as follows:

A batch of the white acrylic paste was mixed with a 50% solution of butanol-modified melamine resin in xylene to prepare a white enamel (E) corresponding to batch (A) in resin and pigment content. Comparison batch (F) was similarly prepared from the white acrylic paste and a 50% solution of butanol-modified benzoguanamine resin in xylene.

All six batches were diluted with a 1:1 butanol-xylene mixture to a viscosity of 20–30 seconds (25 degrees C.) to make them suitable for spraying, and mild steel panels were sprayed with the several batches to form enamel coatings having a thickness of 20–30 microns after curing. The sprayed panels were baked at 150 degrees C. for 30 minutes to cure the enamel coatings, and were then exposed to ultraviolet light under uniform conditions. They were placed 25 cm. from an ultraviolet lamp at right angles to the direction of the incident rays, and the degree of discoloration was determined after seven days as $$\frac{B-A}{G}$$

wherein

B is reflectivity of light through red filter
A is reflectivity of light through blue filter
G is reflectivity of light through green filter The following results were obtained:

| Batch: | Degree of discoloration |
|---|---|
| A | 0.0230 |
| B | 0.0311 |
| C | 0.0340 |
| D | 0.0250 |
| E | 0.0342 |
| F | 0.0409 |

The surface gloss of the test panels was also determined before and after exposure to ultraviolet light according to the method of Japanese Industrial Standard 6-8741, the specular reflectivity at a 60 degree angle being determined:

| Batch | A | B | C | D | E | F |
|---|---|---|---|---|---|---|
| Reflectivity before exposure | 90 | 89 | 90 | 90 | 85 | 92 |
| After exposure | 71 | 65 | 62 | 60 | 60 | 59 |

As is evident from the test data, the white enamels (A)–(D) of the invention are superior in their ultraviolet resistance to the known comparison products (E) and (F).

What is claimed is:
1. A method of preparing a resin which comprises:
   (a) reacting a compound of the formula wherein R is —CH$_2$— or —C(CH$_3$)$_2$—CH$_2$—, with four to eight moles of formaldehyde in a medium essentially consisting of water, a lower alkanol or mixtures thereof at a temperature between approximately 50° C. and the boiling point of said medium and at a pH between 5.0 and 9.0 until said compound reacts with said formaldehyde to form a methylol spiroacetal guanamine;
   (b) mixing said methylol spiroacetal guanamine with a lower alkanol in an amount of one to three moles of said alkanol per mole of said formaldehyde;
   (c) holding the resulting mixture at an initial pH of 4.0 to 6.0 and substantially at the boiling temperature thereof until an ether of said alkanol in said mixture with said methylol spiroacetal is formed; and (d) removing from said mixture the water formed simultaneously with said ether.

2. The resin prepared by the method of claim 1.

References Cited

UNITED STATES PATENTS

| | | | |
|---|---|---|---|
| 2,532,519 | 12/1950 | Simons | 260—67.7 |
| 3,275,660 | 9/1966 | Wasson et al. | 260—67.6 |
| 3,296,337 | 1/1967 | Zimmerman | 260—864 |
| 3,450,715 | 6/1969 | Wasson et al. | 260—67.6 |

HAROLD D. ANDERSON, Primary Examiner

R. J. KOCH, Assistant Examiner

U.S. Cl. X.R.

117—161; 260—21, 249.9, 850, 851